United States Patent
Suzuki et al.

(10) Patent No.: US 6,961,505 B2
(45) Date of Patent: Nov. 1, 2005

(54) METAL HOLDER, OPTICAL COMPONENT COMPOSITE BODY AND MANUFACTURING METHOD

(75) Inventors: Katsunori Suzuki, Hamamatsu (JP); Yasuaki Takano, Hamamatsu (JP); Yasunori Nishimura, Fujisawa (JP)

(73) Assignees: Yamaha Corporation, Shizuoka-ken (JP); Mitsubishi Denki Kabushiki Kaisha, Tokyo (JP)

( * ) Notice: Subject to any disclaimer, the term of this patent is extended or adjusted under 35 U.S.C. 154(b) by 277 days.

(21) Appl. No.: 10/322,671

(22) Filed: Dec. 19, 2002

(65) Prior Publication Data

US 2003/0157362 A1 Aug. 21, 2003

(30) Foreign Application Priority Data

Dec. 25, 2001 (JP) .................................. P2001-391240

(51) Int. Cl.[7] .................................................. G02B 6/00
(52) U.S. Cl. ........................................ 385/137; 385/147
(58) Field of Search ................................ 385/134–137, 385/147, 88, 89

(56) References Cited

U.S. PATENT DOCUMENTS 6,116,793 A * 9/2000 Finzel et al. .................... 385/99
2004/0136001 A1 * 7/2004 Nishimura et al. .......... 356/416

* cited by examiner

Primary Examiner—John D. Lee
(74) Attorney, Agent, or Firm—Dickstein, Shapiro, Morin & Oshinsky, LLP.

(57) ABSTRACT

An optical component composite body is obtained in which there is no damage to the optical component even when it is bonded to a metal holder by solder or low melting point glass. The metal holder of the present invention is provided with a mounting portion protruding from one side of the main body and a grasping portion protruding from the other side of the main body. The mounting portion is provided with a plurality of protrusions formed in a comb tooth configuration. An optical component formed from alumina ($Al_2O_3$) is bonded by solder to a bonding surface of a protrusion, another optical component formed from $LiNbO_3$ is bonded by solder to a bonding surface of another protrusion, and a further optical component formed from $YVO_4$ is bonded by solder to a bonding surface of a further protrusion.

18 Claims, 5 Drawing Sheets

METAL HOLDER, OPTICAL COMPONENT COMPOSITE BODY AND MANUFACTURING METHOD

BACKGROUND OF THE INVENTION

Field of the Invention

The present invention relates to a metal holder that fixes an optical component formed from optical glass or an optical crystal used in optical filters or wave plates by solder or by the fusion bonding of low melting point glass, and to an optical component composite body formed by fixing an optical component to this metal holder, and to a manufacturing method therefor.

DESCRIPTION OF THE RELATED ART

Conventionally, an optical component formed from optical glass or an optical crystal such as rutile (titanium oxide), garnet, alumina, $LiNbO_3$, $YVO_4$, α-BBO, calcite, $CaF_2$, and $MgF_2$ used in optical filters or wave plates is bonded to a metal holder, and the resulting combined unit forms an optical component composite body. This method is widely used in infrared optical systems and ultraviolet systems. Low temperature soldering, high temperature soldering, wax, or low melting point glass is used when bonding these optical components to the metal holder. In this case, because of their comparatively low coefficient of thermal expansion, generally, an iron—nickel alloy or an iron—nickel—cobalt alloy (commercially known as Kovar), or stainless steel such as SUS304, SUS316, SUS450, SUS430F, invar, or the like are used for the metal holder When an optical component such as this is bonded to a metal holder using low temperature solder, high temperature solder, wax, or low melting point glass, thermal stress arising from differences in the coefficients of thermal expansion of the various materials is generated in the optical component after the bonding. This causes the optical characteristics of the optical component to deteriorate, and in some cases, the problem arises that the optical component is damaged. For this reason, a method in which thermal stress is not generated in the optical component even when the optical component and metal holder are bonded has been disclosed in, for example, Japanese Patent Application Laid-Open No. 12-106407.

In the method disclosed in Japanese Patent Application Laid-Open No. 12-106407, an entire outer surface of an optically transparent member (optical component) formed from borosilicate based amorphous glass is integrally bonded by brazing to a fixing member (metal holder) formed from an iron—nickel alloy having a coefficient of thermal expansion similar to that of the optically transparent member. As a result, it is possible to prevent thermal stress, which occurs due to the difference in the coefficients of thermal expansion of the two, being generated in the optically transparent member, thereby enabling degradation in the optical characteristics of the optically transparent member to be prevented.

However, even when an entire outer surface of an optical component is integrally bonded by brazing to a metal holder having a coefficient of thermal expansion similar to that of the optical component using the method disclosed in the aforementioned Japanese Patent Application Laid-Open No. 12-106407, distortion occurs in the optical component after the welding, and breaks and cracks are generated in the optical component, causing the problem of the optical component becoming damaged.

Therefore, when the present inventors looked for the cause of the breaks and cracks that occur after welding in the optical component, it became clear that there was a large coefficient of thermal expansion in some optical components, or that there was a large coefficient of thermal expansion in a particular direction (for example, the direction of the crystal axis), and the thermal stress caused by the difference in the coefficients of thermal expansion is generated in the optical component after it was bonded to the metal holder. Furthermore, some of the optical components had a cut edge, and it also became clear that, in these components with a cut edge, thermal stress acted on minute cracks and breaks present in the cut edge after the bonding. This caused the minute cracks and breaks to grow, thereby damaging the optical component.

The present invention was conceived in order to solve the above problems, and it is an object thereof to provide an optical component composite body in which there is no damage to the optical component even when the optical component is bonded to the metal holder.

SUMMARY OF THE INVENTION

In order to achieve the above objects, the metal holder of the present invention is provided with a mounting portion to which a plurality of optical components are bonded and fixed, and a plurality of protrusions that are formed in a comb tooth configuration so that portions of one end of a light entrance surface or light exit surface of the optical components can be bonded and fixed to said mounting portion. If a plurality of protrusions arranged in a comb tooth configuration in this way are used as bonding surfaces for bonding with one end portion of the optical components, the remaining end portion of the light entrance surface or light exit surface of the optical components is not fixed to the metal holder. Therefore, it is possible to provide a metal holder capable of preventing in advance the occurrence of distortion that is caused by thermal stress generated in the one end portion of the optical components, other than the bonding surface, after the bonding thereof with the metal holder.

Furthermore, the metal holder of the present invention may be provided with a mounting portion to which said optical components are bonded and fixed; protrusions so that portions of one end of a light entrance surface or light exit surface of the optical components can be bonded and fixed to said mounting portion; and a step portion for bonding said optical components to a surface of said protrusions. The metal holder of the present invention may be provided with a mounting portion to which said optical components are bonded and fixed; a plurality of protrusions that are formed in a comb tooth configuration so that portions of one end of a light entrance surface or light exit surface of the optical components can be bonded and fixed to said mounting portion; and a step portion for bonding said optical components to a surface of said protrusions.

In this case, if a portion of a bonding surface of the protrusions is provided with a mounting portion that is located at an edge of the portions of the one end of the optical components, and that is mounted so as to form a space between itself and these one end portions, then it is possible to provide a metal holder capable of further reducing the occurrence of distortion that is caused by thermal stress generated in the one end portion of the optical components after the bonding thereof with the metal holder. Moreover, if a step portion that protrudes minutely from this bonding surface is provided in a portion of the bonding surface, then a space is created between the bonding surface and the step portion. Therefore, it is possible when brazing an optical component to the step portion to use this space to form a runoff area for the solder. As a result, it is possible to prevent beforehand solder that has leaked into the runoff from bonding with the end portions of the optical component. Moreover, it is desirable that the metal holder is formed from an alloy having as main constituents Fe and Ni, an alloy having Fe, Ni, and Co as main constituents, or stainless steel, whose coefficients of thermal expansion are similar to that of the optical components.

Furthermore, in the optical component composite body of the present invention the metal holder is provided with a mounting portion in which a plurality of protrusions that are formed in a comb tooth configuration is arranged, where portions of one end of a light entrance surface or light exit surface of the plurality of optical components are fixed by fusion bonding of the low melting point glass or solder to each of the protrusions. In this way, if a plurality of the protrusions is a bonding surface with portions of one end of the optical components, then the remaining portions of one end of a light entrance surface or light exit surface of the optical components is not fixed to the metal holder. Therefore, distortion that is caused by thermal stress would not occur in the edge of the optical components other than the bonding surface after the bonding thereof with a metal holder. As a result, it is possible to provide an optical component composite body that can prevent in advance distortion due to thermal stress from occurring. Furthermore, the metal holder may be provided with a mounting portion which protrudes from the body of the metal holder, and a step portion for fixing an optical component to the back of the protrusion; and this may constitute an optical component composite body in which one end of a light entrance surface or light exit surface of the optical component is fixed to the step portion by fusion bonding of the low melting point glass or solder.

Furthermore, it is preferable that the metal holder be provided with a mounting portion in which a plurality of protrusions are arranged in a comb tooth configuration, and to each of the protrusions one end of a light entrance surface of light exit surface of the optical component is fixed by fusion bonding of low melting point glass or solder so that portions of one end have a spacing between themselves and bonding surfaces of the protrusions. In this way, if at least one end of a light entrance surface or light exit surface of the optical component is not fixed to the metal holder, then it is possible to prevent distortion due to thermal stress from occurring in the edge of one end of the optical component after bonding to the metal holder. Therefore, it can prevent breaks and cracks from occurring in the optical component.

In this case, it was confirmed by experiments that if the boundary portion of that part of the optical component that is fixed by the fusion bonding of low melting point glass or solder is positioned too close to the edge of the optical component, then the effect of preventing the occurrence of distortion caused by thermal stress is diminished. It was also found that a sufficient distortion prevention effect is obtained if the position of this boundary portion is at least 20 μm away from the edge of the optical component. From this, it can be stated that it is desirable that the boundary portion of the area where the optical components are fixed by fusion bonding of the low melting point glass or solder is located at least 20 μm or more away from the edge of the portion of one end of at least one of the light entrance surface and light exit surface of the optical components. Moreover, the upper limit value of this distance is not particularly limited, and it is desirably set such that there are no adverse effects on the optical characteristics of the optical components. It is also desirable that the optical components be formed from crystals such as alumina, $LiNbO_3$, $YVO_4$, or the like.

If, as described above, a crystalline optical lens or optical filter, in particular, one whose edges have been cut is used as the optical component that is bonded to the metal holder, then it is possible to effectively prevent the generation of distortion caused by thermal stress arising after the bonding. It is thought that in a crystalline optical lens or optical filter whose edges are cut edges, minute cracks and distortions are generated in the edges when they are cut and these minute cracks and distortions are enlarged by thermal stress so that breaks and cracks are generated after boding. However, if, as in the present invention, the metal holder is not bonded for a distance of at least 20 μm from the edge of an optical component, then it is difficult for thermal stress to act on the unbonded portion (in this case, the unbonded portion already has minute cracks and distortions in it).

Moreover, because the optical component formed by a crystalline optical lens or optical filter cannot be bonded by solder, in order to bond the optical component to the metal holder using solder it is desirable that at least the surfaces where the optical component is bonded to the metal holder are provided with a metallized layer formed from a metal that has excellent bondability. In this case, in order to form a metallized layer whose metal has excellent boding strength when bonded with the optical component, it is desirable to employ a laminate structure in which a plurality of metals are laminated so as to increase the bonding strength with the optical components. Note that when the optical components are bonded to the metal holder using low melting point glass, it is not necessary to provide a metallized layer on the surfaces where the optical component is bonded to the metal holder because the low melting point glass bonds directly and firmly to the optical component.

It is necessary for the metal holder to be formed from a material whose coefficient of thermal expansion is similar to that of the optical components, and an alloy having as its main constituents Fe and Ni, an alloy having Fe, Ni, and Co as its main constituents, and stainless steel, which have coefficients of thermal expansion substantially the same as the optical components, are desirable. If there is a possibility of degradation caused by corrosion of the alloy having as its main constituents Fe and Ni, the alloy having as its main constituents Fe, Ni, and Co, or the stainless steel, or in order to improve the bondability with the solder, it is desirable for at least the bonding surfaces of the metal holder to be provided with a plating layer formed from a plurality of metals having excellent corrosion resistance as well as excellent bond strength in the bonded portion. Note that, when low melting point glass is used, because the low melting point glass bonds directly and firmly to the metal holder, no plating layer is needed; however, when corrosion of the metal holder is likely, then Au plating can be provided on the outermost surface thereof.

Furthermore, it is desirable that a solder that bonds both the optical components and the metal holder firmly together be used as the solder. A solder formed from an AuSn alloy, an AuAgCu alloy, an SnAg alloy, or PbSn alloy bonds the optical component and the metal holder firmly together and is also extremely reliable. Therefore, it is desirable for solder formed from a AuSn alloy, a AuAgCu alloy, a SnAg alloy, or a PbSn alloy to be used.

When manufacturing an optical component composite body such as that described above, there can be provided a placing step in which a metal holder that is provided with a mounting portion in which a plurality of protrusions that form bonding surfaces with portions of one end of a light entrance surface or light exit surface of the plurality of optical components are arranged separated from each other in a comb tooth configuration is placed in a jig; an interposing step in which, in order that edges of one end portion of at least one of a light entrance surface or light exit surface of the plurality of optical components are not bonded to the bonding surfaces, the solder or low melting point glass is interposed between the optical components and the bonding surfaces at a position away from the edges; and a melting step in which the solder or low melting point glass is melted. By providing each of these steps, it is possible to fix the end portion of at least one of the light entrance surface or light exit surface of the optical components to the metal holder by solder or low melting point glass, without fixing the edges of the end portion to the metal holder.

Note that, when melting the solder or low melting point glass in the melting step, in some cases the melted solder or low melting point glass drips onto the edges of the end portion of the optical components, so as to thinly coat the surface at the edge of the end portion of the optical component or the surface of the metal holder facing the edge of the end portion of the optical component. However, because the solder or low melting point glass coating the surface of the optical components or solder in this manner does not actually act to bond the optical components and the metal holder together, the optical component is not fixed to the metal holder in this portion. Namely, when the terms "bond" or "fix" are used in the present application, they refer to the solder or low melting point glass sufficiently exhibiting the functions of a bonding material, so that the optical components are sufficiently bonded and fixed to the metal holder.

DESCRIPTION OF THE PREFERRED EMBODIMENTS

Figure 1A:
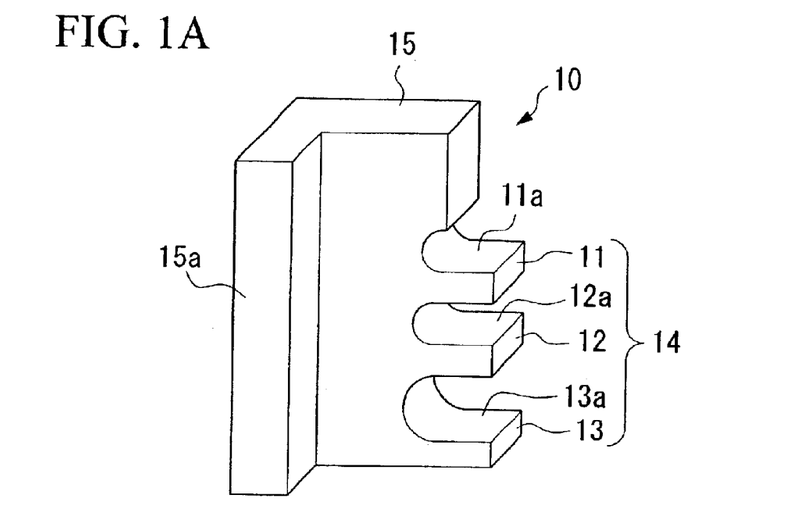
FIGS. 1A to 1C are typical perspective views showing the metal holder of the present invention.
Figure 1B:
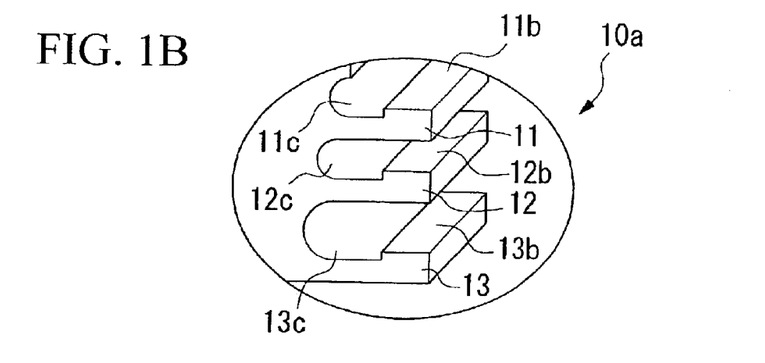
Figure 1C:
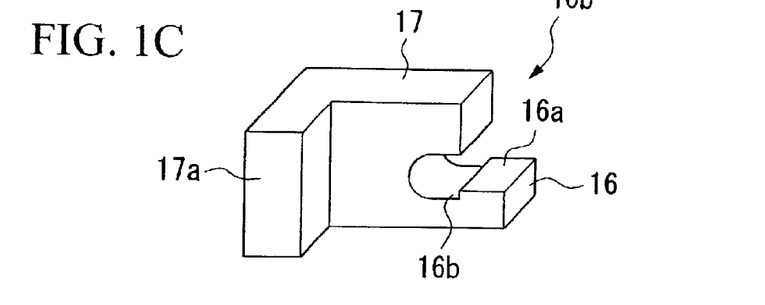
Figure 2A:
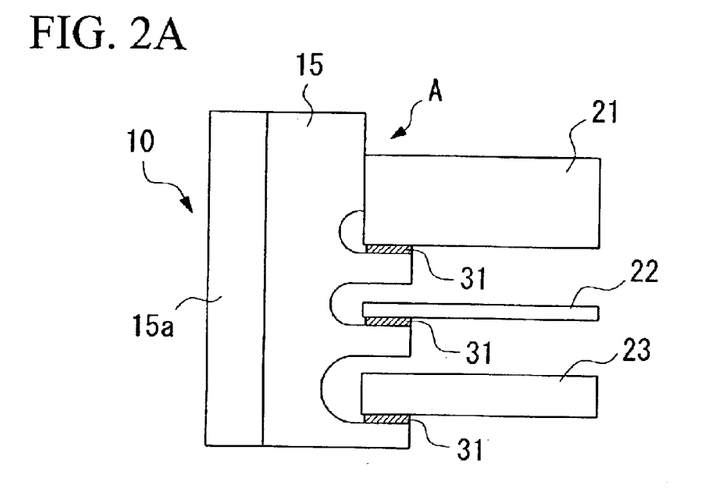
FIGS. 2A to 2C are typical front elevational views showing an optical component composite body in which plural optical components are bonded to the metal holder shown in FIGS. 1A to 1C.
Figure 2B:
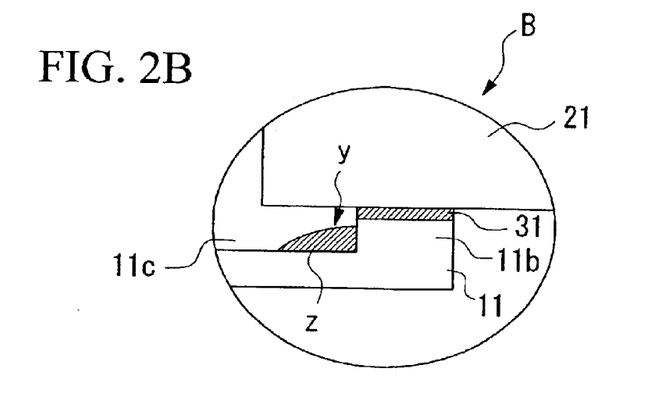
Figure 2C:
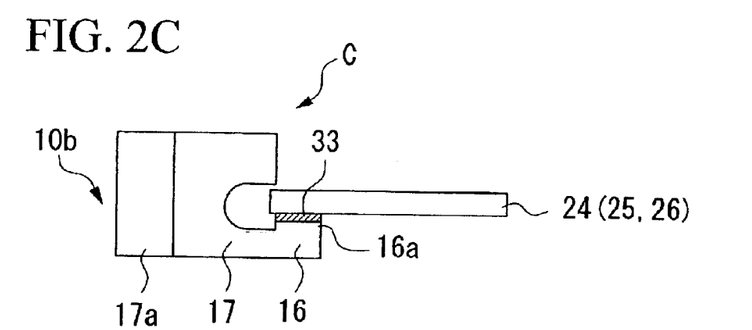
Figure 3A:
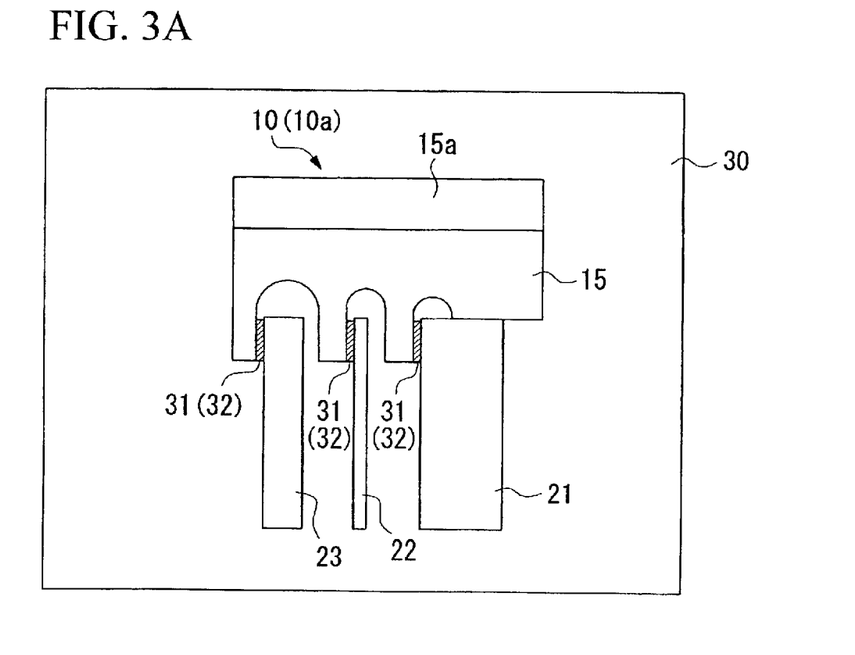
FIGS. 3A and 3B are typical top views showing a state in which a metal holder and a plurality of optical components are loaded in a jig for bonding.
Figure 3B:
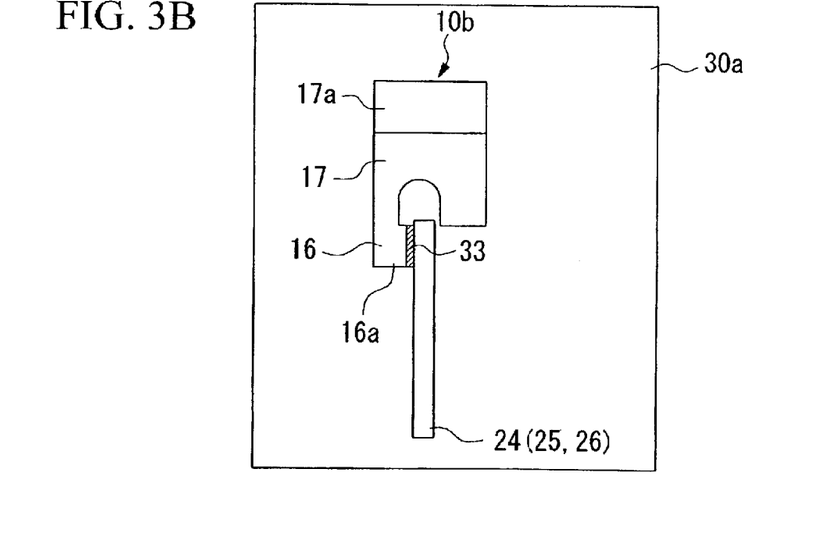
Figure 4A:
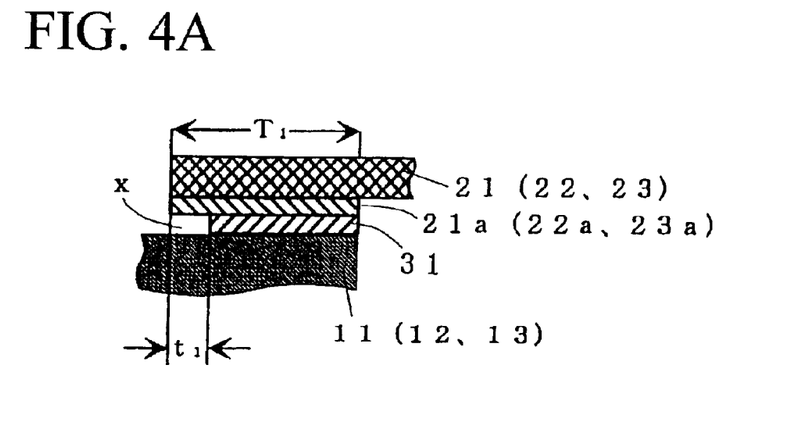
FIGS. 4A to 4C are typical cross sectional views showing a state in which the metal holder and the optical components are bonded.
Figure 4B:
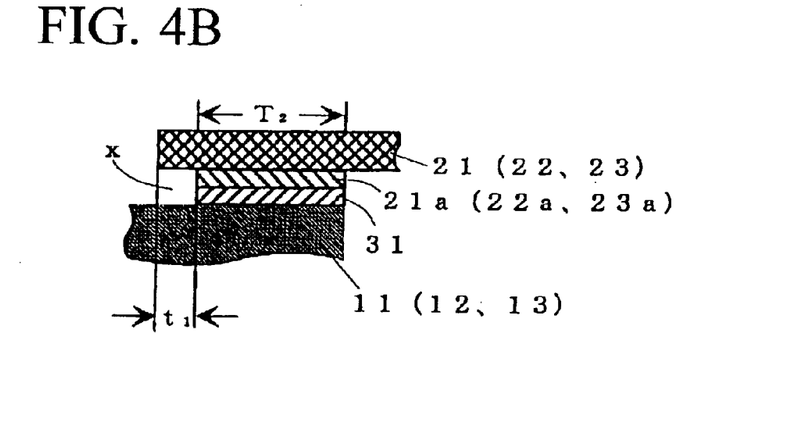
Figure 4C:
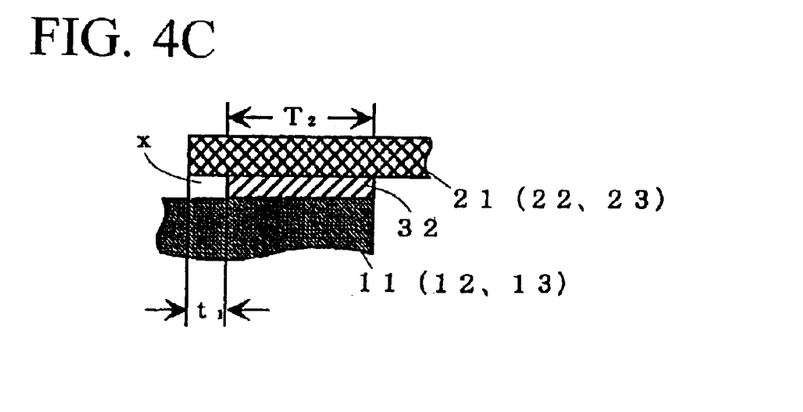
Figure 5A:
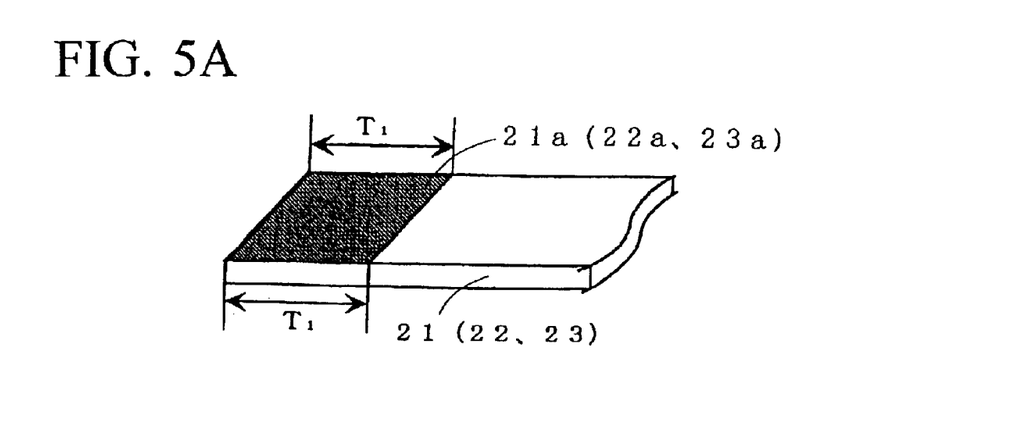
FIGS. 5A to 5C are typical perspective views showing a state in which a metallized layer is formed on a surface of an optical component.
Figure 5B:
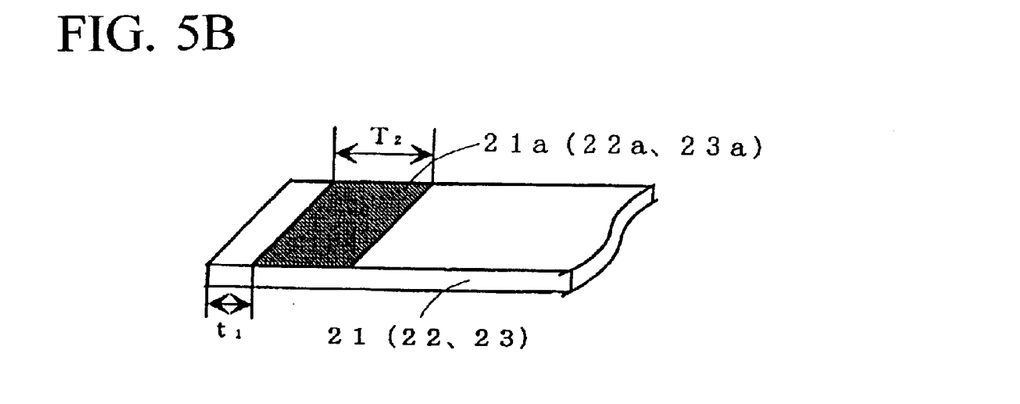
Figure 5C:
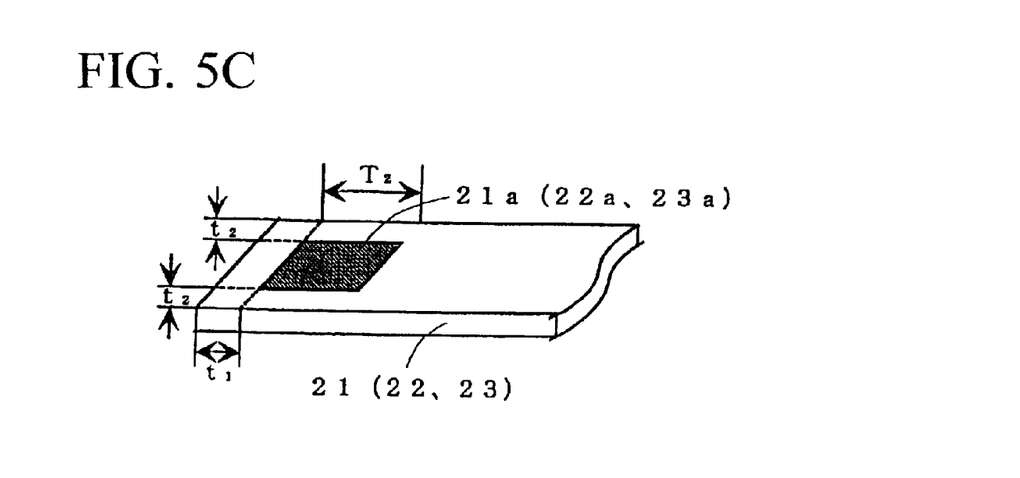

Next, an embodiment of the present invention will be described based on FIGS. 1 to 5. FIGS. 1A to 1C are typical perspective views showing the metal holder of the present invention. FIGS. 2A to 2C are typical front elevational views showing an optical component composite body in which a plurality of optical components are bonded to the metal holder shown in FIGS. 1A to 1C. FIGS. 3A and 3B are typical top views showing a state in which a metal holder and a plurality of optical components are loaded in a jig where they are bonded. FIGS. 4A to 4C are typical cross sectional views showing a state in which the metal holder and the optical components are bonded. FIGS. 5A to 5C are typical perspective view showing a state in which a metallized layer is formed on a surface of an optical component.

1. Metal Holder (1) Metal Holder in a Comb Tooth Configuration

The metal holder 10 of the present invention is constructed by machine working an alloy having as the main constituents Fe and Ni, an alloy having as the main constituents Fe, Ni, and Co, a sintered body of a metal such as stainless steel, or a combination of these metals, whose coefficients of thermal expansion are similar to that of the optical component, so as to form a predetermined configuration such as that shown in FIG. 1A. This metal holder 10 is formed as a flat plate and is provided with a mounting portion 14 that protrudes outwards from one side of the main body, and a gripping portion 15 that is bent in an L shape extending from the other side of the main body.

In the mounting portion 14 a plurality of protrusions 11, 12, and 13 are formed in a comb tooth shape and are positioned such that the spacing between each of the protrusions 11, 12, and 13 is a predetermined spacing (for example, 1550 nm or more). In this case, the top surfaces of the plurality of protrusions 11, 12, and 13 that are arranged in a comb tooth shape are formed as bonding surfaces 11$a$, 12$a$, and 13$a$ for bonding with the optical components described below. In this case, if the gripping portion 15 that is bent in an L shape is gripped by forceps or the like, handling of metal holder 10 (which is extremely small) is made easier.

As is shown in FIG. 1B (note that in FIG. 1B principal parts only are shown in enlargement), it is also possible to form a metal holder 10$a$ provided with step portions 11$b$, 12$b$, and 13$b$ resulting in spaces 11$c$, 12$c$, and 13$c$ being formed on the base side of the bonding surfaces 11$a$, 12$a$, and 13$a$ (i.e., the upper surfaces of the respective protrusions 11, 12, and 13 in FIG. 1B) of the respective protrusions 11, 12, and 13 between the bonding surfaces 11$a$, 12$a$, and 13$a$ and the respective optical components 21, 22, and 23 (see FIG. 2B) that are bonded with this metal holder.

In this case, spaces y (see FIG. 2B) are created between the respective bonding surfaces 11$a$, 12$a$, and 13$a$ and the respective step portions 11$b$, 12$b$, and 13$b$. Therefore, as is described below, when the respective optical components 21, 22, and 23 are brazed to the respective step portions 11$b$, 12$b$, and 13$b$, it is possible for each space y to form a runoff area for the solder. As a result, it is possible in advance to prevent solder z that has flowed into the runoff area from becoming bonded to the respective optical components 21, 22, and 23.

(2) Metal Holder with a Single Tooth Configuration

The metal holder may be in a single tooth configuration, as shown in FIG. 1C. The metal holder 10$b$ in a single tooth configuration is provided with a body 17 formed in a plate, a mounting portion 17 protruding from the body 17 to one side thereof, and a holding portion 17$a$ which protrudes from the other side of the body and bends in an L-like form. In this case, a step portion 16$a$ is formed on top surface of the mounting portion 16, and this step portion 16$a$ provides a spacing between the base side of the mounting portion 16 and the optical component 24 bonded to the metal holder 10$b$ (see FIG. 2C).

2. Metal Holder Manufacturing Method

Next, a description will be given of an example of a method of manufacturing the metal holder 10 (10$a$, 10$b$) having the above described structure. Firstly, FeNiCo alloy (Kovar) spherical powder having a particle diameter 20 $\mu$m or less (averaging a particle diameter of 10 $\mu$m) is prepared by an atomizing method, a crushing method, an electrolysis method, a reduction method or the like. Next, a binder formed from polyethylene and a variety of waxes is added to this FeNiCO alloy (Kovar) powder, and the resulting mixture is kneaded to form a composition used for molding. This molding composition is then turned into pellets by a pelletizer. Next, the pellets thus obtained are inserted into a hopper of an injection molding machine and are injection molded at an injection temperature of 160° C. and a metal mold temperature of 35° C. Thereafter, the metal mold is water cooled so as to solidify the injection molded material, and thereby provide a green body metal holder 10 (10a, 10b).

This green body metal holder 10 (10a, 10b) is then placed in a binder removing apparatus (not shown), and is heated to a predetermined temperature so as to remove the binder. Namely, the binder is vaporized (removed) to provide a brown body. This is placed in a sintering furnace and the temperature is raised to 1300° C. at a temperature increase rate of 5° C./h. Thereafter, by continuing the sintering for two hours while maintaining this temperature, a metal holder 10 (10a, 10b) formed from an FeNiCo alloy (Kovar) sintered body is obtained. Note that as another method for preparing the metal holder 10 (10a, 10b), it is possible to use a method in which, firstly, an FeNiCo alloy (Kovar) plate material is rolled out and the rolled plate is then prepared in a predetermined configuration by machine working or press working.

3. Optical Component Composite Body (Optical Filter Apparatus)

Next, a description will be given of an optical component composite body A (shown in FIG. 2A), an optical component composite body B (shown in FIG. 2B), and an optical component composite body C (shown in FIG. 2C) that are formed by bonding optical components to a metal holder 10 (10a, 10b) having the structure described above.

(1) Optical Component Composite Body A

As is shown in FIG. 2A, the optical component composite body A is formed by bonding an optical crystal 21 formed from YVO₄ to the bonding surface 11a of the protrusion 11 of the mounting portion 14 of the metal holder 10 by solder 31, and by bonding an optical crystal 22 formed from LiNbO₃ to the bonding surface 12a by solder 31, and by bonding an optical crystal 23 formed from silver-containing glass (such as polarizer) to the bonding surface 13a by solder 31. Solder 31 can be one of AuSn alloy, AuAgCu alloy, SnAg alloy, or PbSn alloy. PbSn alloy is preferable in that it decreases stress (tension) caused by the solder.

(2) Optical Component Composite Body B

As is shown in FIG. 2B, the optical component composite body B is formed by bonding an optical crystal 21 formed from YVO₄ to the step portion 11b of the protrusion 11 of the mounting portion 14 of the metal holder 10a by solder 31, and by bonding an optical crystal 22 formed from LiNbO₃ to the step portion 12b by solder 31, and by bonding an optical crystal 23 formed from silver-containing glass to the bonding surface 13b by solder 31. Solder 31 can be one of AuSn alloy, AuAgCu alloy, SnAg alloy, or PbSn alloy. PbSn alloy is preferable in that it decreases stress (tension) caused by the solder.

The feature of these optical component composite bodies A and B lies in the fact that, as is shown in FIGS. 4A to 4C, from the bottom edge portion of the respective optical crystals 21, 22, and 23 to the point $t_1 \mu m$, there is an unbonded (unfixed) portion where the optical components are not bonded to the respective bonding surfaces 11a, 12a, and 13a of the metal holder 10, or to the respective step portions 11b, 12b, and 13b of the metal holder 10a. Here, the optical crystals 21, 22, and 23 are formed as flat plates with the planar configuration cut in a predetermined configuration such as a square configuration, a rectangular configuration, or a circular configuration. Moreover, the three plate-shaped optical crystals 21, 22, and 23 are bonded to the respective bonding surfaces 11a, 12a, and 13a or to the respective step portions 11b, 12b, and 13b such that the three plate-shaped optical crystals 21, 22, and 23 are parallel to each other.

As a result, if laser light is sequentially irradiated onto the optical crystals 21, 22, and 23, the optical component composite bodies A and B become optical filter apparatuses that change the optical characteristics of the laser light transmitted through the optical crystals 21, 22, and 23. For example, the optical crystals 21 and 22 function as wavelength plates that change (by rotating the polarization direction) the polarization state by shifting the phases of the incident light. Therefore, the polarization state of the laser light is changed after the transmission when it is transmitted through the optical crystal 21, and the polarization state of this transmitted light is changed after the transmission when it is transmitted through the optical crystal 22. Known examples of this type of wavelength plate include half wavelength plates and quarter wavelength plates.

(3) Optical Component Composite Body C

The optical component composite body C is not in the form of a comb tooth; therefore it differs from the optical component composite bodies A and B having a plurality of metal holders in a comb tooth configuration. As shown in FIG. 2C, the optical crystal 24 formed from YVO₄ is fixed to the step portion 16a of the mounting portion 16 in the metal holder 10b by fusion bonding of a low melting point glass 33. The optical crystal 25 formed from LiNbO₃ or the optical crystal 26 formed from silver-containing glass may be used for fixing. As a result, different optical crystals 24, 25, and 16 are mounted to the optical component composite body C so that three plates of optical crystal 24, 25 and 26 are arranged in parallel, constituting an optical filter device as the above-described optical component composite bodies A and B.

4. Method of Manufacturing the Optical Component Composite Body (1) EXAMPLE 1

A description will now be given of the steps for manufacturing the optical component composite bodies A and B of Example 1 that have the above type of unbonded portion (unfixed portion) x. Firstly, the optical crystal 21 (or 22 or 23) is mounted in a jig or masked such that a membrane can be formed in a predetermined portion (the portion 21a (or 22a or 23a) in FIG. 5 A). After it has then been set in a sputter deposition apparatus, a titanium (Ti) layer is formed by depositing Ti until it reaches a membrane thickness of 0.01 $\mu m$ at a position from one end of the optical crystal 21 (22, 23) to a point $T_1 \mu m$.

Thereafter, a nickel (Ni) layer is formed by depositing Ni until it reaches a membrane thickness of 0.2 $\mu m$. Next, a gold (Au) layer is formed by depositing Au until it reaches a membrane thickness of 0.5 $\mu m$. Finally, the mask or jig is removed thereby forming a metallized layer 21a (22a, 23a), which has a three layer structure formed by a plurality of metals that have excellent bondability and that have excellent bond strength in the bonded portion, in an area from the edge of one end portion of the optical crystal 21 (22, 23) for a distance of $T_1 \mu m$. Note that the respective membrane thicknesses, material substances, membrane forming method and the like of the metallized layer 21a (22a, 23a)

may be selected as is appropriate in consideration of the adhesion strength of the metallized layer 21a (22a, 23a) with the optical crystal 21 (22, 23), or of the effects of the metallized layer 21a (22a, 23a) on the optical characteristics of the optical crystal 21 (22, 23).

The metal holder 10 (10a), on the other hand, is immersed in a plating tank (not shown), and using an electrolysis method, first, nickel (Ni) plating is performed until the membrane thickness reaches 5.0 μm. Next, gold (Au) plating is performed until the membrane thickness reaches 1.0 μm. As a result the respective bonding surfaces 11a, 12a, and 13a of the metal holder 10 (or the step portions 11b, 12b, and 13b of the metal holder 10a) are made so as to be more easily bonded when the solder 31, which is formed from an Au—Sn alloy, is used. Note that the membrane thickness obtained in the plating processing and the substances used for the plating metals are not limited to those described above and may be selected as is appropriate in consideration of the bonding strength and the like thereof with the respective bonding surfaces 11a, 12a, and 13a of the metal holder 10 (or the step portions 11b, 12b, and 13b of the metal holder 10a).

Next, as is shown in FIG. 3, the metal holder 10 (10a) and the optical crystals 21, 22, and 23 are placed in a ceramic jig 30, and solder 31 formed from a thin plate-shaped Au—Sn alloy having a width of $(T_1-t_1)$ μm is interposed between these. Note that, at this time, the solder 31 formed from the Au—Sn alloy is placed at a distance $t_1$ μm away from the edges of the optical crystals 21, 22, and 23 such that no solder 31 is present in the area from the edges of the optical crystals 21, 22, and 23 for a distance of $t_1$ μm.

Thereafter, the jig 30 is placed on a belt having a moving speed of 100 mm/minute in a reflow furnace in a nitrogen gas ($N_2$) atmosphere that contains 40% hydrogen ($H_2$). Heating processing is then performed on the jig 30 in reflow conditions (temperature increase profile) of a heating time of 10 minutes and a maximum temperature of 300° C., resulting in the melting of the solder 31 formed from the Au—Sn alloy. As a result, end portions of the optical crystals 21, 22, and 23 are bonded to the respective bonding surfaces 11a, 12a, and 13a of the metal holder 10 (or the step portions 11b, 12b, and 13b of the metal holder 10a), and an optical component composite body A (B) having an unbonded portion (an unfixed portion) x at the edges of the optical crystals 21, 22, and 23 is prepared.

Note that when fusion bonding the optical crystals 21, 22, and 23 to the respective bonding surfaces 11a, 12a, and 13a of the metal holder 10 (10a) using the solder 31, it is desirable that the amount of solder 31 used be such that melted solder 31 does not leak from the bond portion and spread towards the edges of the optical crystals 21, 22, and 23 (i.e., to the position of the unbonded portion x).

However, even if the surfaces of the optical crystals 21, 22, and 23 at the unbonded portion x or the respective surfaces 11a, 12a, and 13a of the metal holder 10 (10a) become thinly covered by melted and dripping solder 31, any solder 31 that covers the surfaces in this way does not act so as to bond the optical crystals 21, 22, and 23 to the respective bonding surfaces 11a, 12a, and 13a of the metal holder.

Therefore, in this portion the optical crystals 21, 22, and 23 are not fixed to the respective bonding surfaces 11a, 12a, and 13a of the metal holder. Furthermore, in the metal holder 10a provided with the step portions 11b, 12b, and 13b on the bonding surfaces 11a, 12a, and 13a, as is shown in FIG. 2B, a space y is created between the respective bonding surfaces 11a, 12a, and 13a and the respective step portions 11b, 12b, and 13b, enabling a runoff area for the solder to be formed. As a result, it is possible to prevent solder z that has leaked into the runoff area from becoming bonded with the respective optical crystals 21, 22, and 23.

Here, an optical component composite body A (or B) that is bonded in such a manner that the location of the unbonded portion (the unfixed portion) x (i.e., the boundary portion of the area where the optical crystals 21, 22, and 23 are fixed by the fusion bonding of the solder 31) is 10 μm ($t_1=10$ μm) from the edges of the optical crystals 21, 22, and 23 is taken as an optical component composite body A1 (B1). In the same way, an optical component composite body A (or B) that is bonded in such a manner that the location of the unbonded portion is 20 μm ($t_1=20$ μm) from the edges of the optical crystals 21, 22, and 23 is taken as an optical component composite body A2 (B2); one in which the location of the unbonded portion is 30 μm ($t_1=30$ μm) from the edges of the optical crystals 21, 22, and 23 is taken as an optical component composite body A3 (B3); and one in which the location of the unbonded portion is 50 μm ($t_1=50$ μm) from the edges of the optical crystals 21, 22, and 23 is taken as an optical component composite body A4 (B4). Moreover, in order to make a comparison, an optical component composite body A (B, C) is prepared in which the bonded portion goes right up to the edges of the optical crystals 21, 22, and 23 ($t_1=0$ μm), and this is taken as a composite body A5 (B5).

(2) EXAMPLE 2

Next, a description will be given of the steps for manufacturing an optical component composite body A (B) of Example 2 that has the unbonded portion (unfixed portion) x. The feature of the optical component composite body A (B) of Example 2 lies in the fact that, while the area from the edges of the optical crystals 21, 22, and 23 extending for a distance of $t_1$ μm still forms the unbonded portion (unfixed portion) x, there are no metallized layers 21a, 22a, and 23a on the surfaces of the optical crystals 21, 22, and 23 facing this unbonded portion x. A description will now be given of the steps for manufacturing an optical component composite body A (B) that has this type of unbonded portion (unfixed portion) x.

Firstly, the optical crystals 21, 22, and 23 are mounted in a jig or masked such that a membrane can be formed in predetermined portions (the portions 21a, 22a, and 23a in FIG. 5 B). After it has then been set in a sputter deposition apparatus, a titanium (Ti) layer is formed by depositing Ti until it reaches a membrane thickness of 0.01 μm at a position from one end of the optical crystals 21, 22, and 23 extending for a distance of $T_2$ μm. Thereafter, a nickel (Ni) layer is formed by depositing Ni until it reaches a membrane thickness of 0.2 μm.

Next, a gold (Au) layer is formed by depositing Au until it reaches a membrane thickness of 0.5 μm. Finally, the mask or jig is removed thereby forming metallized layers 21a, 22a, and 23a with a three layer structure formed by a plurality of metals that have excellent bondability in an area between a point starting at a distance $t_1$ μm from the edges of the bottom end portions of the optical crystals 21, 22, and 23 and a point at a distance of $T_2$ μm, and that have excellent bond strength in the bonded portion. Note that the respective membrane thicknesses, material substances, membrane forming method and the like of the metallized layers 21a, 22a, and 23a may be selected as is appropriate in consideration of the adhesion strength of the metallized layers 21a, 22a, and 23a with the optical crystals 21, 22, and 23, or of the effects of the metallized layers 21a, 22a, and 23a on the optical characteristics of the optical crystals 21, 22, and 23.

The metal holder 10 (10a), on the other hand, is immersed in a plating tank (not shown) and using an electrolysis method, firstly, nickel (Ni) plating is performed until the membrane thickness reaches 5.0 μm. Next, gold (Au) plating is performed until the membrane thickness reaches 1.0 μm. As a result the respective bonding surfaces 11a, 12a, and 13a of the metal holder 10 (or the step portions 11b, 12b, and 13b of the metal holder 10a) are made so as to be more easily bonded by Au—Sn based solder 31. Note that the membrane thickness obtained in the plating processing and the substances used for the plating metals are not limited to those described above and may be selected as is appropriate in consideration of the bonding strength and the like thereof with the metal holder 10 (10a).

Next, as is shown in FIG. 3, the metal holder 10 (10a) and the optical crystals 21, 22, and 23 are placed in a ceramic jig 30, and solder 31 formed from a thin plate-shaped Au—Sn alloy having a width equal to $T_2$ μM is interposed between these. At this time, the solder 31 formed from the Au—Sn alloy is positioned at a distance equal to $t_1$ μm away from the edges of the optical crystals 21, 22, and 23 such that no solder 31 is present in the area from the edges of the optical crystals 21, 22, and 23 for the distance $t_1$ μm.

Thereafter, the jig 30 is placed on a belt having a moving speed of 100 mm/minute in a reflow furnace in a nitrogen gas ($N_2$) atmosphere that contains 40% hydrogen ($H_2$). Heating processing is then performed on the jig 30 in reflow conditions (temperature increase profile) of a heating time of 10 minutes and a maximum temperature of 300° C., resulting in the melting of the solder 31 formed from the Au—Sn alloy. As a result, end portions of the optical crystals 21, 22, and 23 are bonded to the respective bonding surfaces 11a, 12a, and 13a of the metal holder 10 (or the step portions 11b, 12b, and 13b of the metal holder 10a), and an optical component composite body A (B) having an unbonded portion (an unfixed portion) x at the edges of the optical crystals 21, 22, and 23 is prepared.

Here, an optical component composite body A (or B) that is bonded in such a manner that the locations of the unformed portions and unbonded portions (the unfixed portions) x of the metallized layers 21a, 22a, and 23a (i.e., the boundary portion of the area where the optical crystals 21, 22, and 23 are fixed by the fusion bonding of the solder 31) are 10 μm ($t_1=10$ μm) is taken as an optical component composite body A6 (B6). In the same way, one that is bonded in such a manner that the location is 20 μm ($t_1=20$ μm) is taken as an optical component composite body A7 (B7); one that is bonded in such a manner, that the location is 30 μm ($t_1=30$ μm) is taken as an optical component composite body A8 (B8); and one that is bonded in such a manner that the location is 50 μm ($t_1=50$ μm) is taken as an optical component composite body A9 (B9). Moreover, in order to make a comparison, an optical component composite body A (B) is prepared in which the metallized layers 21a, 22a, and 23a are formed right up to the edges of the optical crystals 21, 22, and 23 ($t_1=0$ μm), and that is bonded up to the edges of the optical crystals 21, 22, and 23 ($t_1=0$ μm), and this is taken as a composite body A10 (B10).

(3) EXAMPLE 3

Next, a description will be given of the steps for manufacturing an optical component composite body A (B) of Example 3 that has the unbonded portion (unfixed portion) x. The features of the optical component composite body A (B) of Example 3 lie in the fact that no metallized layers are formed on the optical crystals 21, 22, and 23, and that no plating layers are formed on the metal holder 10 (10a); in the fact that the optical crystals 21, 22, and 23 are bonded to the respective bonding surfaces 11a, 12a, and 13a (11b, 12b, and 13b) of the metal holder 10 (10a) using low melting point glass 32; and in the fact that the optical component composite body A (B) has an unbonded portion (unfixed portion) x where the optical crystals 21, 22, and 23 are not bonded to the respective bonding surfaces 11a, 12a, and 13a (11b, 12b, and 13b) of the metal holder 10 (10a) in the area from the edges of the optical crystals 21, 22, and 23 extending for a distance of $t_1$ μm. Note that, if corrosion of the metal holder 10 (10a) is a concern, it is possible to apply gold (Au) plating as the outermost surface of the metal holder 10 (10a).

Next, a description will be given of the steps for manufacturing an optical component composite body A (B) that has the above described type of unbonded portion (unfixed portion) x. Firstly, as is shown in FIG. 3, the metal holder 10 (10a) and the optical crystals 21, 22, and 23 are placed in a ceramic jig 30, and PbO based low melting point glass 32 formed in a thin plate-shape and having a width of $T_2$ μm is interposed between these. At this time, the PbO based low melting point glass 32 is positioned at a distance equal to $t_1$ μm away from the edges of the optical crystals 21, 22, and 23 such that no low melting point glass 32 is present in the area from the edges of the optical crystals 21, 22, and 23 for the distance $t_1$ μm.

Thereafter, the jig is placed on a belt having a moving speed of 100 mm/minute in a reflow furnace in a 100% nitrogen gas ($N_2$) atmosphere. Heating processing is then performed on the jig 30 in reflow conditions (temperature increase profile) of a heating time of 10 minutes and a maximum temperature of 480° C., resulting in the melting of the PbO based low melting temperature glass 32. As a result, the optical crystals 21, 22, and 23 are bonded to the respective bonding surfaces 11a, 12a, and 13a of the metal holder 10 (or the step portions 11b, 12b, and 13b of the metal holder 10a), and an optical component composite body A (B) having an unbonded portion (an unfixed portion) X at the edges of the optical crystals 21, 22, and 23 is prepared.

Note that when fusion bonding the optical crystals 21, 22, and 23 to the respective bonding surfaces 11a, 12a, and 13a of the metal holder 10 (10a, 10b) using the PbO based low melting point glass 32, it is desirable that the amount of low melting point glass 32 used be such that melted PbO based low melting point glass 32 does not leak from the bond portion and spread towards the edges of the optical crystals 21, 22, and 23 (i.e., to the position of the unbonded portion z). However, even if the surfaces of the optical crystals 21, 22, and 23 at the unbonded portion x or the respective surfaces 11a, 12a, and 13a of the metal holder 10 (10a) become thinly covered by melted and dripping low melting point glass 32, low melting point glass 32 that covers the surfaces in this way does not cause a bond to be created between the optical crystals 21, 22, and 23 and the respective bonding surfaces 11a, 12a, and 13a of the metal holder. Therefore, in this portion the optical crystals 21, 22, and 23 are not fixed to the respective bonding surfaces 11a, 12a, and 13a of the metal holder 10 (10a).

Moreover, an optical component composite body A (or B) that is bonded in such a manner that the locations of the unbonded portions x (i.e., the boundary portion of the area where the optical crystals 21, 22, and 23 are fixed by the fusion bonding of the low melting point glass 32) are 10 μm ($t_1$=10 μm) from the edges of the optical crystals 21, 22, and 23 is taken as an optical component composite body A11 (B11). In the same way, one that is bonded in such a manner that the location is 20 μm ($t_1$=20 μm) is taken as an optical component composite body A12 (B12); one that is bonded in such a manner that the location is 30 μm ($t_1$=30 μm) is taken as an optical component composite body A13 (B13); and one that is bonded in such a manner that the location is 50 μm ($t_1$=50 μm) is taken as an optical component composite body A14 (B14). Moreover, in order to make a comparison, an optical component composite body A (B) is prepared in which the bonded portion goes right up to the edges of the optical crystals 21, 22, and 23 ($t_1$=0 μm), and this is taken as a composite body A15 (B15).

(4)

Next, a process of manufacturing the optical component composite body C is explained. This composite body C is different from the above-described examples in that it has plural metal holders in a single tooth configuration, rather than a metal holder in a comb tooth configuration. The optical crystal 24 (25, 26) is fixed to a surface of the step portion 16a of the metal holder 10b using a low melting point glass 33. The same method for fixing as describe above for the optical component composite bodies A and B can be used.

During the process of manufacturing the optical component composite body C, as shown in FIG. 3B, the metal holder 10b and the optical crystal 24 (25, 26) are mounted to the ceramic jig 30a, and therebetween is placed PbO type low melting point glass 33 in a flat panel having the same width as that of the step portion 16a. After this, the jig is placed in a belt moving at a speed of 100 nm/min in reflow forging under a 100% N$_2$ atmosphere, and then it is subjected to heating for 10 min. under reflow conditions with the highest temperature of 480° C. (a profile for raising temperature), so that the PbO type low melting point glass 33 melts. As a result, the optical component composite body C in which the optical crystal 24 (25, 26) is fixed to the step portion 16a of the metal holder 10b is prepared.

4. Heating and Cooling Test

Next, using 100 each of the respective optical component composite bodies A (A1 to A12) and the optical component composite bodies B (B1 to B12) that were prepared in the manner described above, heating/cooling tests were preformed. In these tests, a cycle in which the respective optical component composite bodies were first cooled to minus 40° C., at which temperature they were held for 30 minutes, and were then heated to plus 85° C., at which temperature they were held for 30 minutes, was repeatedly performed. The rate at which cracks were generated (the crack incidence rate (%)) in each composite body A (A1 to A12) and B (B1 to B12) was measured. The results of these measurements are shown in Table 1 below.

TABLE 1

| Type of composite body | Distance from edge of unbonded portion | Crack incidence rate (%) |
|---|---|---|
| A1 (B1) | 10 μm | 50 |
| A2 (B2) | 20 μm | 5 |
| A3 (B3) | 30 μm | 0 |
| A4 (B4) | 50 μm | 0 |
| A5 (B5) | 0 μm | 92 |
| A6 (B6) | 10 μm | 62 |
| A7 (B7) | 20 μm | 7 |
| A8 (B8) | 30 μm | 0 |
| A9 (B9) | 50 μm | 0 |

TABLE 1-continued

| Type of composite body | Distance from edge of unbonded portion | Crack incidence rate (%) |
|---|---|---|
| A10 (B10) | 0 μm | 95 |
| A11 (B11) | 10 μm | 71 |
| A12 (B12) | 20 μm | 3 |
| A13 (B13) | 30 μm | 0 |
| A14 (B14) | 50 μm | 0 |
| A15 (B15) | 0 μm | 98 |

As is clear from the results shown in Table 1, when the optical component composite bodies A and B are prepared using any of the methods of Examples 1 to 3, in the composite bodies A5 (B5), A10 (B10), and A15 (B15) in which the unbonded portion x (y, z) of the optical crystals 21, 22, and 23 with the metal holder 10 (10a) is 0 μm from the edge of the optical crystals 21, 22, and 23 (i.e., $t_1$=0 μm), in other words, in which there is no unbonded portion x, it can be seen that the crack incidence rates are the high figures of 92%, 95%, and 98%. It can be considered that the reason for this is that, when the optical crystals 21, 22, and 23 are bonded with the metal holder 10 (10a), distortion caused by thermal stress is generated in the optical crystals 21, 22, and 23, and this distortion increases each time the heating and cooling are repeated, so that, ultimately, cracks are generated in the optical crystals 21, 22, and 23. Note that because an optical crystal having a smaller thickness than the optical crystal 23 is used for the optical crystal 22, cracks tend to occur more easily in the optical crystal 22 than in the optical crystal 23.

In contrast, when the unbonded portion x where the optical crystals 21, 22, and 23 are not bonded with the metal holder 10 (10a) is separated at a distance of $t_1$ μm from the edges of the optical crystals 21, 22, and 23, as is the case with the composite bodies A1 to A4 (B1 to B4), the composite bodies A6 to A9 (B6 to B9), and the composite bodies A11 to A14 (B11 to B14), it can be seen that crack incidence rate in the optical crystals is decreased. It can be considered that the reason for this is that, by placing the unbonded portion x at a distance of $t_1$ μm away from the edges of the optical crystals 21, 22, and 23, when the optical crystals 21, 22, and 23 are bonded with the metal holder 10 (10a), it is possible to effectively prevent the generation of distortion caused by thermal stress generated in the optical crystals 21, 22, and 23.

However, even when an unbonded portion x is provided, if, as in the cases of the composite bodies A1 (B1), A6 (B6), and A11 (B11), the unbonded portion x is only a small distance i.e., 10 μm from the edges of the optical crystals 21, 22, and 23 (i.e., $t_1$=10 μm), then it can be seen that the crack incidence rates in the optical crystals 21, 22, and 23 are still large at 50%, 62%, and 71%. It can be considered that the reason for this is that, particularly in the case of the optical crystals 21, 22, and 23, in which the edges are cut edges, because minute cracks and distortions are generated in the cut edges when they are cut, if the distance of the unbonded portion x is too close to the edges of the optical crystals 21, 22, and 23, then when the optical crystals 21, 22, and 23 are bonded to the metal holder 10 (10a), thermal stress acts on these minute cracks and distortions causing them to grow, and this increases each time the heating and cooling are repeated, so that the crack incidence rate also increases.

In contrast, if, as in the cases of the composite bodies A2 to A4 (B2 to B4), the composite bodies A7 to A8 (B7 to B8), and the composite bodies A12 to A14 (B12 to B14), the unbonded portion x is at a distance of 20 μm or more from the edges of the optical crystals 21, 22, and 23 (i.e., $t_1=20 \mu m$ or more), then it can be seen that the crack incidence rates decrease to 5%, 7%, 3% or 0%. It can be considered that the reason for this is that, if the unbonded portion extends for 20 $\mu m$ or more from the edges of the optical crystals 21, 22, and 23, then when the optical crystals 21, 22, and 23 are bonded to the metal holder 10 (10a), it is difficult for thermal stress to act on the minute cracks and distortions generated in the cut edges when they are cut. From this it can be stated that the distance of the unbonded portion (i.e., the distance to the boundary portion of the area where the optical crystals 21, 22, and 23 are fixed to the metal holder 10 (10a) by fusion bonding of the low melting point glass 32 or solder 31) from the edges of the optical crystals 21, 22, and 23 is desirably 20 $\mu m$ or more.

As has been described above in detail, in the present invention, optical crystals 21, 22, and 23 (24 (25, 26)) are bonded and fixed to protrusions 11, 12, and 13 (16) of the metal holder 10 (10a, 10b) by solder 31 or low melting point glass 32 (33), and are bonded to a mounting portion 14 (17) while unbonded portions x or spaces 11c, 12c, and 13c (16b) are formed at the edges of the end portions of the optical crystals 21, 22, and 23 (24, (25, 26)). As a result, it is possible to reduce the effects of distortion in the optical crystals 21, 22, and 23 (24, (25, 26)) that is caused by thermal stress occurring when the optical crystals 21, 22, and 23 (24, (25, 26)) are bonded to the metal holder 10 (10a, 10b). Moreover, as a result of this it is possible to prevent breaks and cracks from occurring in the end portions of the optical crystals 21, 22, and 23 (24, (25, 26)).

Note that, in each of the above described embodiments, a metal holder 10 (10a) having a mounting portion 14 in which three protrusions 11, 12, and 13 are formed in a comb tooth configuration, or a metal holder 10b having a mounting portion 17 in which one protrusion 16 is formed in a single tooth configuration is used as an example; however, the number of protrusions is not limited to three or one, and it is possible to also have 2, or 4, or 5 or more protrusions. In this case, it is necessary to provide a number of optical crystals that suits the use to which the optical component composite body will be applied. The same comb tooth configuration is employed even when there are two protrusions.

Furthermore, in each of the above embodiments, an example is described in which planar optical crystals having quadrangular planar configuration are used. In the examples used, unbonded portions are provided extending for a predetermined distance from the edges of these end portions of the optical crystals for bonding end portions of these optical crystals to bonding surfaces of protrusions on the metal holder; however, the present invention is not limited to this, and variations of this structure are possible. For example, as is shown in FIG. 5C, it is also possible to form metallized layers 21a, 22a, and 23a over an area extending from a point $t_1 \mu m$ from the edges of the optical crystals 21, 22, and 23 for a distance of $T_2 \mu m$ excluding areas for a distance of $t_2 \mu m$ from both side edges, thereby providing an unbonded portion extending for a predetermined distance from the edge of one end of the optical crystals and at both side portions thereof.

Furthermore, when an optical filter having a circular planar configuration is used, a portion of the circumference can be bonded to the metal holder, and the unbonded portion is provided a predetermined distance from the circumference edge. In other words, at least an end portion of the optical filter can be bonded to the metal holder, and the unbonded portion provided a predetermined distance from the edge.

Furthermore, the planar configuration of the optical filter is not limited to a quadrangular or circular configuration, and various types of planar configuration can be employed. Moreover, it is also possible for a planar optical filter to have a spherical surface or a concave surface. In addition, the optical filter is not limited to having a planar configuration and various configurations such as columnar, tetrahedron, conical, and spherical configurations may be employed.

What is claimed is:

1. A metal holder to which are fixed by fusion bonding of low melting point glass or solder a plurality of optical components into which light is irradiated, wherein the metal holder is provided with:

a mounting portion to which said plurality of optical components are bonded and fixed, and a plurality of protrusions that are formed in a comb tooth configuration so that portions of one end of a light entrance surface or light exit surface of the optical components can be bonded and fixed to said mounting portion.

2. A metal holder to which are fixed by fusion bonding of low melting point glass or solder a plurality of optical components into which light is irradiated, wherein the metal holder is provided with:

a mounting portion to which said optical components are bonded and fixed, protrusions so that portions of one end of a light entrance surface or light exit surface of the optical components can be bonded and fixed to said mounting portion, and a step portion for bonding said optical components to a surface of said protrusions.

3. A metal holder to which are fixed by fusion bonding of low melting point glass or solder a plurality of optical components into which light is irradiated, wherein the metal holder is provided with:

a mounting portion to which said plurality of optical components are bonded and fixed, a plurality of protrusions that are formed in a comb tooth configuration so that portions of one end of a light entrance surface or light exit surface of the optical components can be bonded and fixed to said mounting portion, and a step portion for bonding said optical components to a surface of said protrusions.

4. The metal holder according to any one of claims 1 to 3, wherein the metal holder is formed from an alloy having as main constituents Fe and Ni, an alloy having Fe, Ni, and Co as main constituents, or stainless steel, whose coefficients of thermal expansion are similar to that of the optical components.

5. An optical component composite body in which a plurality of optical components into which light is irradiated are fixed by fusion bonding of low melting point glass or solder to a metal holder, wherein the metal holder is provided with a mounting portion in which a plurality of protrusions are arranged in a comb tooth configuration, and wherein portions of one end of a light entrance surface or light exit surface of the optical components are fixed by fusion bonding of the low melting point glass or solder to the protrusions.

6. An optical component composite body in which optical components into which light is irradiated are fixed by fusion bonding of low melting point glass or solder to a metal holder, wherein the metal holder is provided with:

a mounting portion that constitutes protrusions protruding from a body of said metal holder, and a step portion for bonding said optical components to a surface of said protrusions; and wherein one end portions of a light entrance surface or light exit surface of the optical components are fixed by fusion bonding of the low melting point glass or solder to the step portion.

7. An optical component composite body in which a plurality of optical components into which light is irradiated are fixed by fusion bonding of low melting point glass or solder to a metal holder, wherein the metal holder is provided with:

a mounting portion in which a plurality of protrusions are arranged in a comb tooth configuration, and wherein portions of one end of a light entrance surface or light exit surface of the optical components are fixed by fusion bonding of the low melting point glass or solder to each of the protrusions, and said portions of one end have a spacing between themselves and bonding surfaces of the protrusions.

8. An optical component composite body in which a plurality of optical components into which light is irradiated are fixed by fusion bonding of low melting point glass or solder to a metal holder, wherein the metal holder is provided with:

a mounting portion in which a plurality of protrusions arranged in a comb tooth configuration, and a step portion for bonding said optical components to a surface of said protrusions are provided, and wherein edges of portions of one end of a light entrance surface or light exit surface of the optical components are fixed by fusion bonding of the low melting point glass or solder to each of the step portion.

9. The optical component composite body according to any one of claims 5 to 8, wherein a boundary portion of an area where the optical components are fixed by fusion bonding of the low melting point glass or solder is located at least 20 µm or more away from an edge of the optical components.

10. The optical component composite body according to any one of claims 5 to 8, wherein the optical components are formed from alumina, $LiNbO_3$, or $YVO_4$.

11. The optical component composite body according to any one of claims 5 to 8, wherein the portion of the surface of the optical components that is bonded by at least the fusion bonding of the low melting point glass or solder is provided with a metallized layer formed from a plurality of metals that have excellent bondability with the optical components and that have excellent bond strength.

12. The optical component composite body according to any one of claims 5 to 8, wherein the metal holder is formed from an alloy having as main constituents Fe and Ni, an alloy having Fe, Ni, and Co as main constituents, or stainless steel, whose coefficients of thermal expansion are similar to that of the optical components.

13. The optical component composite body according to any one of claims 5 to 8, wherein at least the portion of the surface of the metal holder that is bonded by the fusion bonding of the low melting point glass or solder is provided with a plating layer formed from a plurality of metals that have excellent anti-corrosion properties and that have excellent bond strength.

14. The optical component composite body according to any one of claims 5 to 8, wherein the solder is a AuSn alloy, a AuAgCu alloy, a SnAg alloy, or a PbSn alloy.

15. A method for manufacturing an optical component composite body in which optical components into which light is irradiated are fixed by fusion bonding of low melting point glass or solder to a metal holder, comprising:

a placing step in which a metal holder that is provided with a mounting portion in which protrusions that form step portions as bonding surfaces with portions of one end of a light entrance surface or light exit surface of the optical components are arranged is placed in a jig;

an interposing step in which the solder or low melting point glass is interposed between the portion of one end of at least one of a light entrance surface or light exit surface of the optical components and the step portion formed on a surface of said protrusions; and a melting step in which the solder or low melting point glass is melted.

16. A method for manufacturing an optical component composite body in which a plurality of optical components into which light is irradiated are fixed by fusion bonding of low melting point glass or solder to a metal holder, comprising:

a placing step in which a metal holder that is provided with a mounting portion in which a plurality of protrusions that form bonding surfaces with portions of one end of a light entrance surface or light exit surface of the plurality of optical components are arranged in a comb tooth configuration is placed in a jig;

an interposing step in which, in order that edges of portions of one end of at least one of a light entrance surface or light exit surface of the plurality of optical components are not bonded to the bonding surfaces, the low melting point glass or solder is interposed between the optical components and the protrusion in an area away from the edges; and a melting step in which the low melting point glass or solder is melted.

17. The method for manufacturing an optical component composite body according to claim 16, wherein there is provided a metallizing step in which a metallized layer formed from a plurality of metals that have excellent bondability with the optical components and that have excellent bond strength is provided in advance on at least the surface of the portion of the optical components that is bonded by the fusion bonding of the low melting point glass or solder.

18. The method for manufacturing an optical component composite body according to claim 16 or 17, wherein there is provided a plating step in which a plating layer formed from a plurality of metals that have excellent anti-corrosion properties and that have excellent bond strength is provided in advance on at least the surface of the portion of the metal holder that is bonded by the fusion bonding of the low melting point glass or solder.

* * * * *